United States Patent
Kumar et al.

(10) Patent No.: US 9,672,382 B2
(45) Date of Patent: Jun. 6, 2017

(54) MANAGING ACCESS OF USER INFORMATION BY THIRD PARTY APPLICATIONS

(71) Applicant: International Business Machines Corporation, Armonk, NY (US)

(72) Inventors: Apurva Kumar, Uttar Pradesh (IN); Jim A. Laredo, Katonah, NY (US); Laura Z. Luan, Scarsdale, NY (US); Sougata Mukherjea, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 14/335,054

(22) Filed: Jul. 18, 2014

(65) Prior Publication Data

US 2016/0019401 A1    Jan. 21, 2016

(51) Int. Cl.
*G06F 7/04* (2006.01)
*G06F 21/62* (2013.01)

(52) U.S. Cl.
CPC .. *G06F 21/6272* (2013.01); *G06F 2221/2141* (2013.01)

(58) Field of Classification Search
CPC ......... H04L 63/08; H04L 63/10; H04L 63/20; H04L 29/06; H04L 63/0428; G06F 21/6218; G06F 21/10; G06F 21/6272
See application file for complete search history.

(56) References Cited

U.S. PATENT DOCUMENTS

| | | | |
|---|---|---|---|
| 5,941,947 A * | 8/1999 | Brown et al. | 709/225 |
| 7,660,748 B2 | 2/2010 | Archer et al. | |
| 8,549,073 B2 | 10/2013 | Dale et al. | |
| 8,826,446 B1 * | 9/2014 | Liu et al. | 726/26 |
| 2009/0013413 A1 * | 1/2009 | Vera et al. | 726/30 |

(Continued)

FOREIGN PATENT DOCUMENTS

EP    2593859 A1    5/2013

OTHER PUBLICATIONS

Oneall.com, Increase Your Registration Rate by Allowing Your Users to Login with their Social Network Account, http://www.oneall.com/, accessed Jul. 18, 2014, pp. 1-2.

(Continued)

*Primary Examiner* — Ali Abyaneh
(74) *Attorney, Agent, or Firm* — Ryan, Mason & Lewis, LLP

(57) ABSTRACT

Methods, systems, and computer program products for managing access of user information by third party applications are provided herein. A method includes compiling a set of user instructions for providing access of user resources to one or more third party applications, wherein the set of user instructions specifies a context in which each of multiple items of the user resources at one or more application programming interface providers can be accessed by the third party applications; mapping a request from one of the third party applications for access to one or more items of the user resources to the application programming interface providers, which correspond to one or more entities maintaining the user resources; and granting access to the one or more items of the user resources to said one third party application through the application programming interface providers based on the set of user instructions.

18 Claims, 6 Drawing Sheets

(56) References Cited

U.S. PATENT DOCUMENTS

| | | | |
|---|---|---|---|
| 2011/0219423 A1* | 9/2011 | Aad et al. | 726/1 |
| 2012/0036360 A1 | 2/2012 | Bassu et al. | |
| 2012/0109999 A1 | 5/2012 | Futty et al. | |
| 2012/0323794 A1* | 12/2012 | Livshits | G06Q 30/02 705/80 |
| 2014/0046896 A1 | 2/2014 | Potter | |
| 2014/0059695 A1* | 2/2014 | Parecki et al. | 726/26 |
| 2014/0075574 A1* | 3/2014 | Zheng et al. | 726/28 |
| 2014/0157422 A1* | 6/2014 | Livshits et al. | 726/26 |
| 2015/0058324 A1* | 2/2015 | Kauwe | 707/722 |

OTHER PUBLICATIONS

Singly.com, Appcelerator + Singly (http://blog.singly.com/2013/08/22/singly-joins-appcelerator/), http://www.singly.com/, accessed Jul. 18, 2014, pp. 1-7.

Hartt, The OAuth 2.0 Authorization Framework, Microsoft, Internet Engineering Task Force (IETF), Oct. 2012, pp. 1-152.

* cited by examiner

MANAGING ACCESS OF USER INFORMATION BY THIRD PARTY APPLICATIONS

FIELD OF THE INVENTION

Embodiments of the invention generally relate to information technology, and, more particularly, to third party access to user data.

BACKGROUND

Users commonly interact with a large number of service providers over the cloud, wherein each service provider specializes in providing a certain type of service, such as an email service, a chat service, a blogging service, a calendar service, a mapping service, a content sharing service, a location sharing service, etc. As part of providing the service, the given service provider maintains a set of resources on behalf of the user. Such resources can include, for example, personal information such as a profile, contacts, and pictures, and can also include basic capabilities offered by the service provider platform such as the ability to read or post messages on behalf of the user, obtaining a user location or status, etc. Service provider platforms often expose these resources to third parties through web-based application programming interfaces (APIs). Such APIs allow third parties to build applications (apps) that leverage service provider capabilities to provide add-on services to the user or otherwise enrich the user experience.

To protect privacy of the user, service providers hosting such resources commonly require the user to explicitly authorize access to third parties. The user is authenticated by the service provider and requested to delegate permissions to access a given resource to a third party. This allows the third party applications to make authorized calls to the service provider API to obtain the given resource for a limited time. However, such authorization approaches include challenges and drawbacks.

For example, a smartphone user commonly has a considerable number of third party applications downloaded from application stores on his or her smartphone. Many such applications require access to user resources such as identification (ID) information, a profile, user location, etc. for which such applications need to connect to multiple service providers. As such, the user is subject to an authentication and delegation workflow for each external service used by an application. Additionally, such a process has to be performed individually for each application installed by the user. Moreover, once the user has granted access to his or her resources to a third party application, he or she has limited control over the context in which the information may be accessed. It is desirable, therefore, that the user be permitted to specify the context in which the access be allowed.

Also, another drawback of the above-noted existing approaches includes the fact that each application is responsible for connecting with other domains and managing user identity across domains. Much of the effort in integrating with a new service can occur in implementing the handshake required for receiving end-user authorization for resources hosted by the service provider.

Further, third party applications commonly need to make multiple invocations to perform a single task. Not only are such low-level resource requests inefficient but also undesirable from a user privacy perspective. This often results in significantly more user information being exposed to the third party than is strictly necessary to execute a transaction.

Accordingly, a need exists for techniques to control access of user information by third party applications.

SUMMARY

In one aspect of the present invention, techniques for managing access of user information by third party applications are provided. An exemplary computer-implemented method can include steps of compiling a set of user instructions for providing access of user resources to one or more third party applications, wherein the set of user instructions specifies a context in which each of multiple items of the user resources at one or more application programming interface providers can be accessed by the one or more third party applications; mapping a request from one of the third party applications for access to one or more items of the user resources to the one or more application programming interface providers, which correspond to one or more entities maintaining the user resources; and granting access to the one or more items of the user resources to said one third party application through the one or more application programming interface providers based on the set of user instructions.

In another aspect of the invention, an exemplary computer-implemented method can include steps of linking, via an access broker, one or more user resources accounts with one or more application programming interface providers corresponding to one or more entities maintaining the user resources, wherein the access broker comprises a party that mediates access to the user resources hosted in one or more domains; providing, to the access broker, a set of user instructions for permitting access of user resources to one or more third party applications, wherein the set of user instructions specifies a context in which each of multiple items of the user resources can be accessed by the one or more third party applications, wherein at least a portion of the context is determined by a user action performed at one or more of the application programming interface providers; and delegating, to the access broker, granting of access to the user resources to one of the third party applications through the one or more application programming interface providers, wherein said granting of access is based on the set of user instructions.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
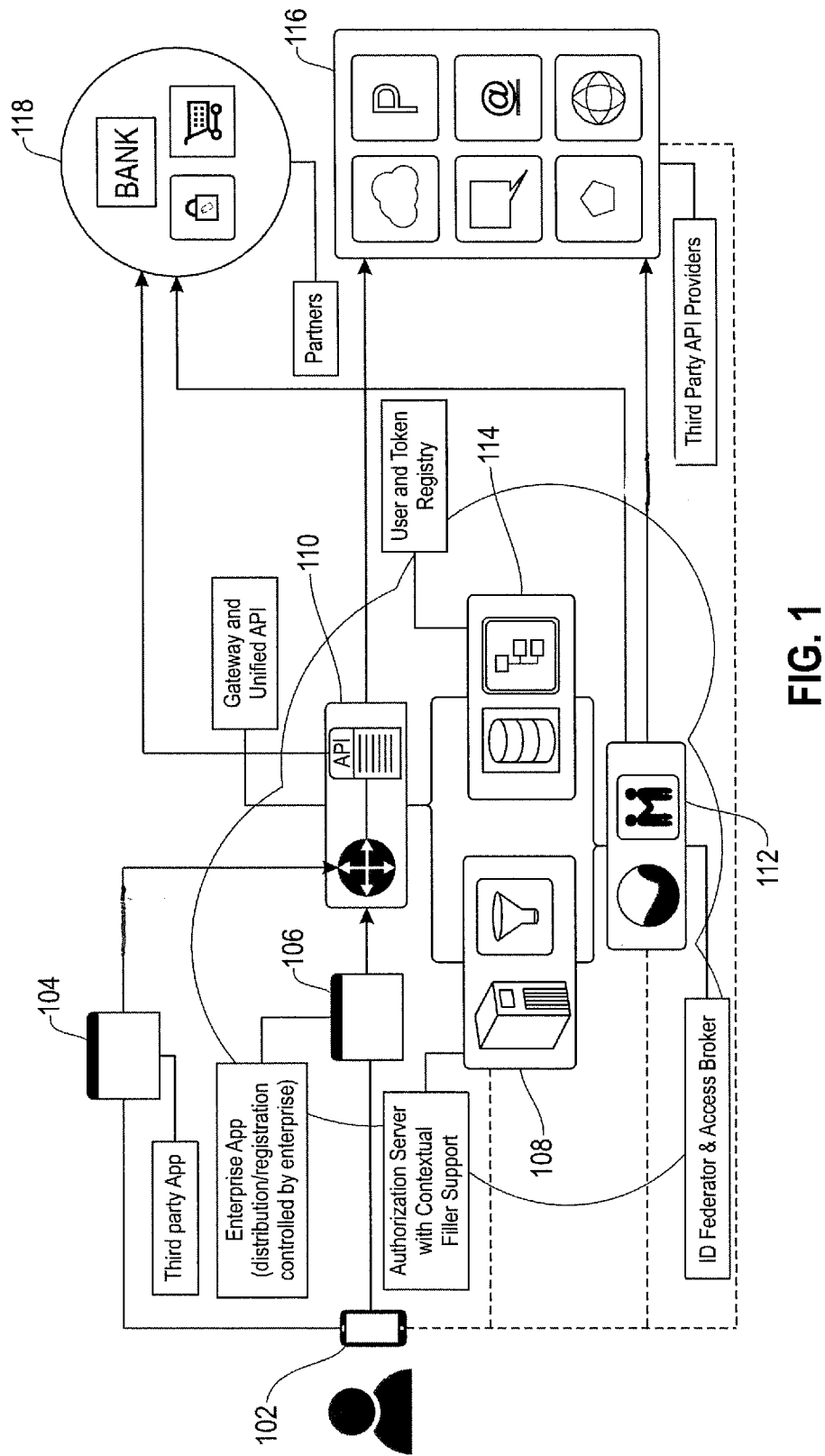
FIG. 1 is a diagram illustrating an API access broker framework, according to an embodiment of the present invention.

As described herein, an aspect of the present invention includes a framework for API access brokerage. At least one embodiment of the invention includes enabling a user to specify one or more contexts for allowing a third party application to access user information and/or user resources stored at multiple service providers via an access broker. By way of example, in an example embodiment of the invention, the access broker role is played by an enterprise managing marketplace of third party applications.

As used herein, the term "resources" refers not only to data elements such as a customer profile, contacts, messages, location, etc., but also refers more generally to any capability supported by an API provider to perform any operation, action or transaction on behalf of or with respect to the user. It should also be noted that resources exposed to third parties can be different from those available from API providers, due to the possibility of aggregation and combining of features.

Additionally, as used herein, the term "context" is not limited to variables such as time, location, device factors etc., and noted context information need not be available within the domain controlling access of third party applications. In general, any user action at any API provider domain can be utilized in the specification of context.

Further, as also used herein, an access broker is a mediator component that controls and/or arranges for access to user resources hosted at a set of service providers. The access broker, in at least one embodiment of the invention, includes a service provider that is trusted by the user and has access to user resources hosted in different API provider domains.

As described herein, the access broker provides a mechanism for the user to link his or her local account with each of his or her accounts at API providers. Linking of accounts with the broker implies capability at the broker level to request resources from the provider domain through the provider API. Accordingly, in the linking process, the user authorizes the access broker to access some resources on the user's behalf. In at least one embodiment of the invention, such linking can be carried out in multiple ways. For example, the access broker can be aware of the user identity at the provider, and the access broker is trusted by the provider for user authentication. By way of another example, the access broker can possess a valid token representing delegation of permissions to access a set of resources at the provider. One or more embodiments of the invention include not limiting the methods through which such linking can be implemented, though existing trust-based identity linking workflows provided by Security Assertions Markup Language (SAML) or resource authorization workflows such as OAuth1.0a, OAuth 2.0 can be used, by way of example.

In at least one embodiment of the invention, the access broker can aggregate and compose resources from multiple provider domains and expose a richer, more abstract resource model designed to improve privacy. This is possible when one or more resources obtained from API providers are used as input in the composition process but do not appear as part of the requested resource. For example, the access broker can retrieve a bank account balance of a customer in its implementation logic for an operation requested by a third party without ever sharing the bank account balance itself with this party. Additionally, the access broker enables a user to delegate access to aggregated resources to third party applications using existing protocols and/or web authorization protocols described herein. As such, rather than simply grant or deny a permission to a third party, an aspect of the invention enables a user to grant the permission in a specific context.

It is also noted that information owners are also commonly API providers. As such, at least one embodiment of the invention enables API-based access to not only user data (such as email, contacts, etc.) but also to capabilities such as posting a message, sending a friend request, making a payment, etc.

As also detailed herein, the access broker can act as a proxy for one or more provider APIs, or the access broker can provide a richer API exposing a new resource model constructed by combining APIs from multiple providers. The set of permissions associated with the access broker API can be the union of those supported by each of the provider APIs, or, if the access broker exposes a new resource model obtained by a composition of provider APIs, a corresponding permissions model can be defined.

Additionally, in accordance with one or more embodiments of the invention, third party applications, rather than requesting access to user resources directly from API providers, can utilize the API provided by the access broker. The access broker maps each incoming request to one or more requests to provider APIs. The access broker also uses the user context present in the incoming request to identify the current user. In each request to an API provider, the access broker includes an ID or access token associated with the current user, obtained during the linking process. If the same API is being exposed by an access broker, at least one embodiment of the invention includes carrying out the exposure actions transparently through a proxy other than insertion of the ID or access token. In at least one embodiment of the invention, the access broker additionally manages renewal of access tokens, agreements, etc. that are required for continued access to user resources at API providers.

In contrast to disadvantageous existing approaches (such as noted herein), at least one embodiment of the invention includes enabling the user to perform a linking operation merely once. In such an embodiment, permissions to access user resources at an API provider are delegated once to the access broker rather than to each application that needs access to external resources. When an application requests permissions from multiple provider domains and the access broker has already secured these permissions during the linking process, all permissions can be granted from a common user interface (UI) exposed by the access broker. When this interaction occurs at the time of purchasing, downloading or registering for the third party application, the authentication performed for these activities can be reused by the access broker to grant permissions to the third party.

Additionally, in accordance with one or more embodiments of the invention, application developers need not manage linking or even be aware of multiple accounts of a user. Similarly, application developers need not implement complex user authorization flows with each service provider. Further, as detailed herein, at least one embodiment of the invention includes providing access to high-level services to third party applications without giving direct control (to those third party applications) of low-level information and capabilities exposed by online service providers.

As also further described herein, at least one embodiment of the invention includes providing and implementing contextual authorization, wherein, via an access broker, such an embodiment includes specifying restrictions to third party access to an API. Evaluation of these restrictions can include, for example, invoking one or more provider APIs to obtain user context for the request. Additionally, in specifying contextual filters, at least one embodiment of the invention includes using user context information available from online service providers. Such context information allows multiple user actions performed in any of the connected domains to be used as a criterion for permitting access to a third party application.

FIG. 1 is a diagram illustrating an API access broker framework, according to an embodiment of the present invention. By way of illustration, FIG. 1 depicts a user device (also referred to herein simply as "user") 102, a third party application 104, an enterprise application 106 (wherein distribution and/or registration is controlled by the corresponding enterprise), and an authorization server with contextual filter support 108. Additionally, FIG. 1 also depicts a gateway and unified API 110, an ID federator and access broker 112, a user and token registry component 114, third party API providers 116 and components associated with one or more partner entities 118.

As illustrated in FIG. 1, the solid lines represent API based access, while the dashed or broken lines represent browser-based access. Two types of API providers are shown in FIG. 1. One type of API provider 118 includes entities that trust the access broker to act on behalf of their user through a pre-existing agreement. The second type of API provider 116 does not trust the access broker and requires an end-user to explicitly grant access to his or her resources.

As shown in FIG. 1, the ID federator and access broker 112 links the local identity of the user 102 with the user's accounts at external (third party) API providers 116, as well as generates a mapping between a permissions model (exposed by access broker) and the third party API providers 116. Additionally, the ID federator and access broker 112 interacts with the user and token registry component 114 to manage ID and access tokens, including expiry and renewal. Further, as detailed herein, the ID federator and access broker 112 serves as a proxy for authorization requests from third party applications (such as application 104 in FIG. 1) to API providers 116.

As also illustrated in FIG. 1, the authorization server with contextual filter support 108 enables adding contextual filters to scopes, wherein user context is determined through APIs accessible to the access broker 112. By way of example, at least one embodiment of the invention includes the utilization of user-defined filters such as, for instance, allowing permission to a retailer to send offers when the user is checked into one of the retailer's stores, or allowing permission to a retailer to post on the user's social media page if the user has recently made a purchase with the retailer.

Figure 2:
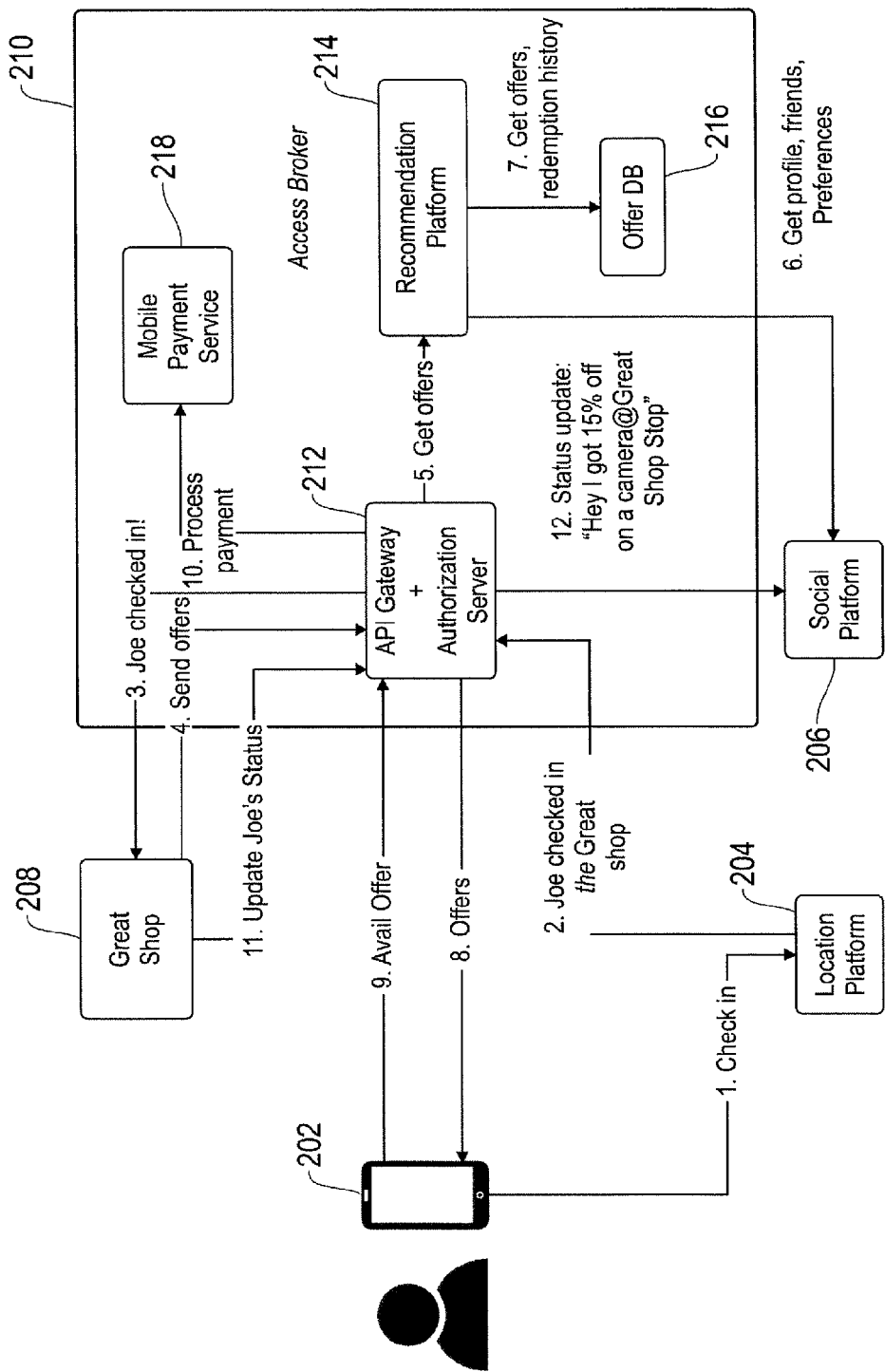
FIG. 2 is a diagram illustrating an example implementation of an embodiment of the present invention.

FIG. 2 is a diagram illustrating an example implementation of an embodiment of the present invention. By way of illustration, FIG. 2 depicts a user device 202 (referred to in this example as Joe's device, or simply "Joe"), a location platform component 204, a social platform component 206, an enterprise component 208 (referred to in this example as Great Shop), and an access broker 210. The access broker 210 includes an API gateway and authorization server 212, a recommendation platform component 214, an offer management database (DB) 216 and a mobile payment service component 218.

The example depicted in FIG. 2 is based on a scenario wherein at least one embodiment of the invention has enabled and/or facilitated the following actions. In conjunction with the following descriptions of the sequence of steps carried out in FIG. 2, the API gateway and authorization server 212 performs the access broker functions, and the access broker 210 represents the entity that performs the access broker function. In the example depicted in FIG. 2, the same entity/enterprise (210) also manages a mobile payment service (via component 218) and a recommendation service (via component 214). Moreover, it is assumed that user Joe has linked his account at the access broker with his accounts at the location (204) and social (206) platforms.

Referring to FIG. 2, Joe, a customer of the Great Shop, allows the enterprise's application to send Joe offers only when Joe is checked-in to one of the Great Shop's stores. However, Joe does not want to share his location with the Great Shop at other times (that is, when Joe is not checked-in to one of the Great Shop's stores), and Joe also does not want share his friends list (as derived from one or more social networks) with the Great Shop. Joe does, in this example, permit the Great Shop application to post on his social network page if Joe has recently made a purchase from a Great Shop store. The Great Shop, on the other hand, wants Joe to be pushed offers based on a purchase and offer history maintained for Joe and his friends.

As such, the example depicted in FIG. 2 includes the follow sequence of events. Joe 202 checks-in to a Great Shop store via the location platform component 204. A notification of Joe's check-in is sent from the location platform component 204 to the API gateway and authorization server 212, which forwards the notification to the Great Shop application 208. In response, the Great Shop application 208 requests the access broker to send offers by invoking an API at the API gateway and authorization server 212. The authorization server allows this request because Joe is checked-in at a Great Shop store. The offers from Great Shop are sent to Joe's device. In addition, as per its agreement with Great Shop, the access broker also uses a recommendation service 214 to send additional offers based on a purchase history of Joe's friends, as described below. The recommendation service 214 uses the social platform 206 to find Joe's friends and uses the offer database 216 to find a history of offers availed to Joe and his friends. On this basis, the access broker determines the additional offers to be sent to Joe. These additional offers are also forwarded to Joe's device 202.

Additionally, Joe 202 can identify and/or select available offers from the set of offers provided thereto, and Joe 202 can indicate such identified and/or selected available offers to the API gateway and authorization server 212. The API gateway and authorization server 212 can process the payment in connection with a selected offer by interacting with the mobile payment service component 218. Also, the API gateway and authorization server 212 can communicate the identified and/or selected available offers to the social platform component 206.

Further, in at least one embodiment of the invention, the access broker 210 can also forward and/or provide offers to Joe based on one or more preferences derived from friends of Joe (in connection with the social platform component 206). In such an embodiment, Joe's privacy is ensured, and the following aspects are realized: (i) Joe does not need to share his friends list with the retailer; (ii) the retailer can only access Joe's location when Joe is visiting one of the retailer's stores; and (iii) the retailer is able to post a status update on a social platform only if Joe has recently made a purchase from the retailer. On the other hand, the retailer is able to make targeted recommendations using information from Joe's friends (or social network acquaintances) and notify Joe's friends of his purchase.

Figure 3:
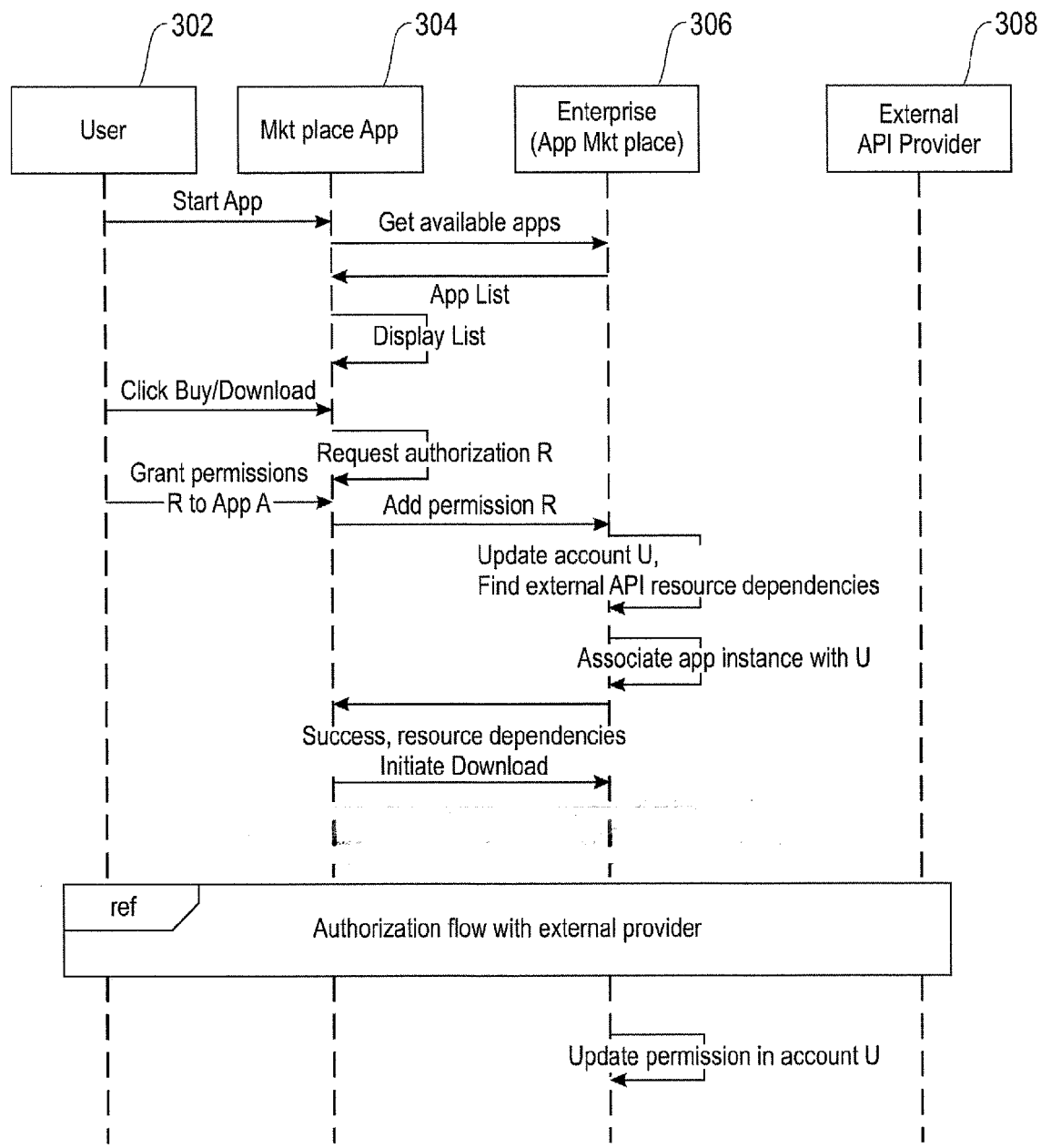
FIG. 3 is a diagram illustrating an authorization flow, according to an embodiment of the present invention.

FIG. 3 is a diagram illustrating an authorization flow, according to an embodiment of the present invention. By way of illustration, FIG. 3 depicts a user 302, an application marketplace 304, an enterprise 306 and an external API provider (such as a social network) 308. As detailed herein, the enterprise 306 manages the application marketplace 304 and also plays the roles of access broker. Additionally, the marketplace application 304 of the enterprise 306 can be used to purchase and/or download new applications. Moreover, the user may have already linked its enterprise account with its account at the external provider 308, thereby granting access to a set of user resources at the provider to the enterprise.

As illustrated in FIG. 3, the user 302 starts and/or accesses the application marketplace 304, which obtains the available applications from the enterprise 306, which are then displayed to the user 302 in a list. The user buys and/or downloads a given application (A) from the list, and the application marketplace requests an authorization (R) from the user 302. The user 302 authorizes a specific instance of the application (A) to access user resources via the external API provider 308. One or more permissions associated with the authorization (R) are notified to the enterprise 306 (as access broker), and the enterprise 306 updates the user's local account (U). The enterprise 306 then checks if one or more permissions in the authorization (R) require access to one or more user resources at API provider 308, as well as if permissions for accessing resources which are not yet granted by the user to the enterprise. These external resource dependencies are communicated to the market place app. The marketplace app indicates to the user that in order to use the application, the user would have to allow some additional permissions to the marketplace (enterprise). If the user agrees, the user is directed to the external API provider's website (for example, by invoking a web browser within the marketplace app or another mechanism) to complete the workflow for granting these additional permissions to the marketplace. After successful delegation of permissions to the enterprise, the local user account (U) is updated with this information. The enterprise then processes the payment and, once successful, initiates download of the specific instance of the application. If no additional permissions are communicated to the user via the marketplace app, then the authorization flow with external provider can be skipped.

Accordingly, FIG. 3 depicts a user granting permissions to a third party application. Subsequently, the access broker maps the permissions to a set of permissions required from API providers. If some of these permissions have not yet been delegated by the user to the broker, the broker redirects the user to do so.

Figure 4:
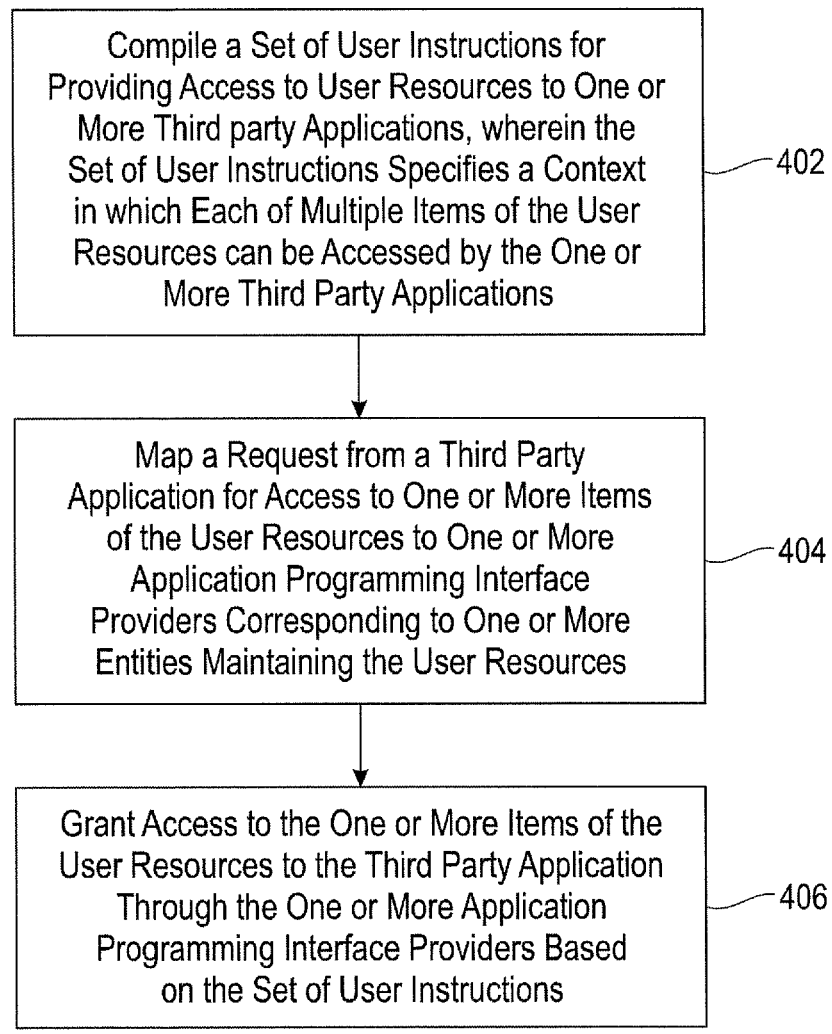
FIG. 4 is a flow diagram illustrating techniques according to an embodiment of the invention.

FIG. 4 is a flow diagram illustrating techniques according to an embodiment of the invention. Step 402 includes compiling a set of user instructions for providing access of user resources to one or more third party applications, wherein the set of user instructions specifies a context in which each of multiple items of the user resources at one or more application programming interface providers can be accessed by the one or more third party applications. This noted compiling can include, for example, querying the user for input, receiving input from the user, etc.

The user specifies criteria based on context in which the user allows access. The user context is queried by the access broker to determine whether the criteria are satisfied and access should be granted. The context is gathered using one or more APIs from service providers for which the user has granted permissions to the access broker. Additionally, in at least one embodiment of the invention, at least a portion of the context is determined by a user action performed at one or more of the application programming interface providers.

As detailed herein, the set of user instructions can include one or more instructions based on a user preference, one or more instructions based on a temporal parameter, one or more instructions based on a location parameter, one or more instructions based on a commercial activity parameter, one or more instructions attributed to a given third party application, and/or one or more instructions associated with a given instance of the given third party application.

Step 404 includes mapping a request from one of the third party applications for access to one or more items of the user resources to the one or more application programming interface providers, which correspond to one or more entities maintaining the user resources. The one or more entities can include, for example, one or more social network providers and/or one or more telecommunications providers.

Step 406 includes granting access to the one or more items of the user resources to said one third party application through the one or more application programming interface providers based on the set of user instructions. Granting can include granting access to the one or more items of the user resources to said one third party application without obtaining additional input from the user in connection with the request. Additionally, granting can include providing to the one or more application programming interface providers (i) information identifying the user and (ii) information specifying the one or more items of the user resources to be exposed.

The techniques depicted in FIG. 4 can also include linking a local account of the user with an account of the user at the one or more application programming interface providers, as well as evaluating the context of the third party application request using one or more application programming interfaces for which the user has granted access during said linking. Further, the techniques depicted in FIG. 4 can additionally include managing renewal of one or more authorizations to access the user resources at the one or more application programming interface providers.

Figure 5:
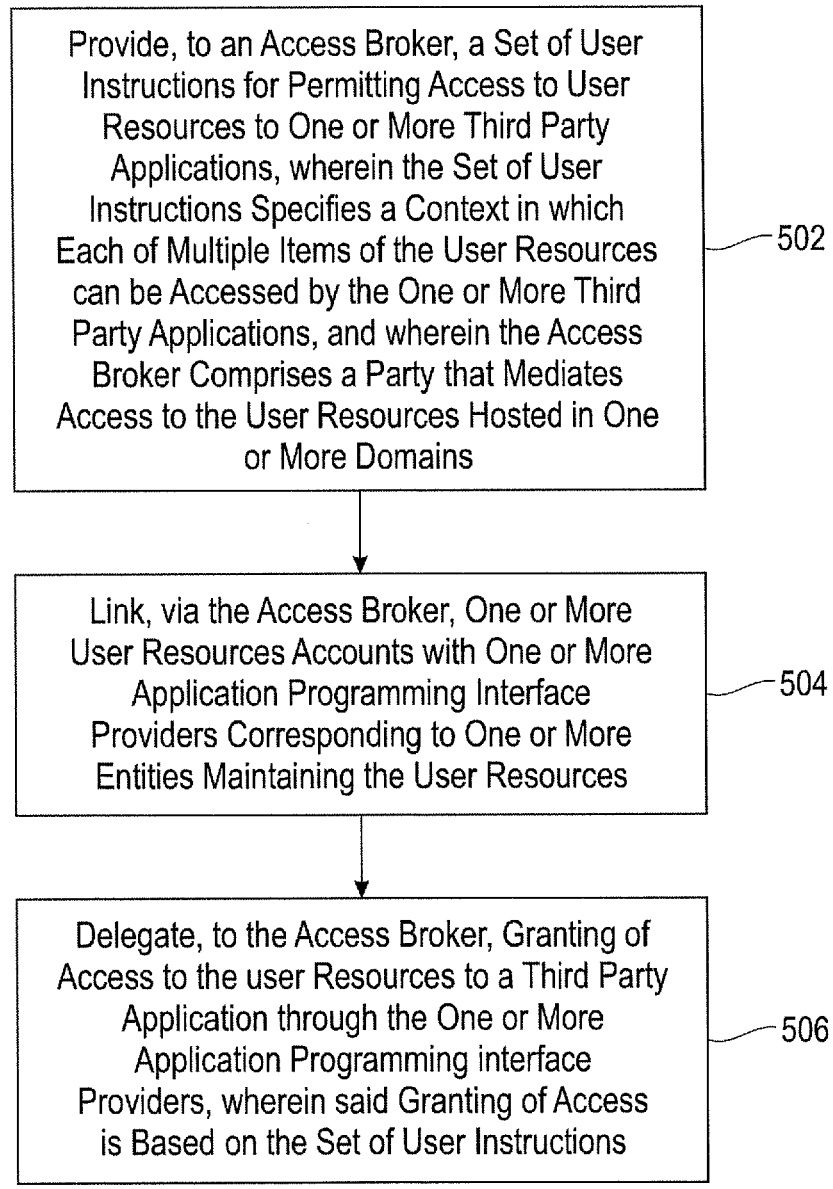
FIG. 5 is a flow diagram illustrating techniques according to an embodiment of the invention.

FIG. 5 is a flow diagram illustrating techniques according to an embodiment of the invention. Step 502 includes providing, to an access broker, a set of user instructions for permitting access of user resources to one or more third party applications, wherein the set of user instructions specifies a context in which each of multiple items of the user resources can be accessed by the one or more third party applications, and wherein the access broker comprises a party that mediates access to the user resources hosted in one or more domains. Additionally, as described herein, at least a portion of the context is determined by a user action performed at one or more of the application programming interface providers.

Step 504 includes linking, via the access broker, one or more user resources accounts with one or more application programming interface providers corresponding to one or more entities maintaining the user resources. Step 506 includes delegating, to the access broker, granting of access to the user resources to one of the third party applications through the one or more application programming interface providers, wherein said granting of access is based on the set of user instructions.

The techniques depicted in FIG. 4 and FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 and FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 6:
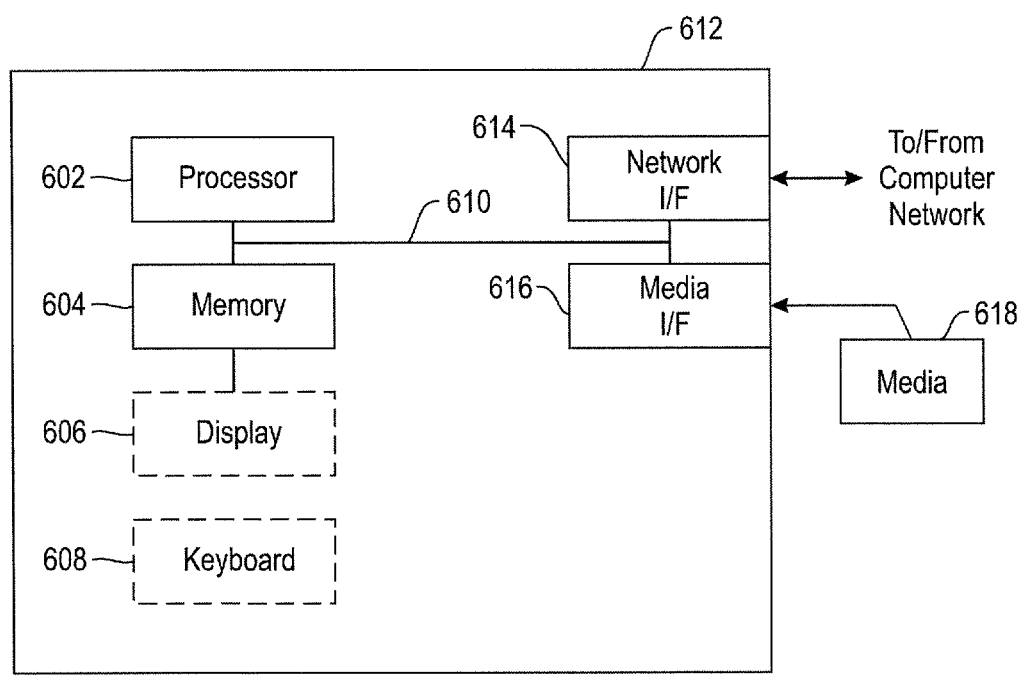
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, providing a mechanism for a user to specify contexts for allowing a third party application to access user information stored at multiple service providers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   compiling, via a single brokerage component, a set of user instructions for providing access of user resources stored across multiple separate domains to one or more third party applications across one or more distinct domains, wherein the set of user instructions specifies a context which permits or denies each of multiple items of the user resources at one or more application programming interface providers to be accessed by the one or more third party applications, and wherein at least a portion of the context is determined by an action performed by a user at one or more of the distinct domains;
   mapping a request from one of the third party applications for access to one or more items of the user resources to the one or more application programming interface providers, which correspond to one or more entities maintaining the user resources; and
   granting access to the one or more items of the user resources to said one third party application through the one or more application programming interface providers based on the set of user instructions, from a common user interface exposed by the brokerage component without obtaining additional input from the user in connection with the request;
   wherein said compiling, said mapping, and said granting are carried out by at least one computing device.

2. The method of claim 1, comprising:
   linking a local account of the user with an account of the user at the one or more application programming interface providers.

3. The method of claim 2, comprising:
   evaluating the context of the third party application request using one or more application programming interfaces for which the user has granted access during said linking.

4. The method of claim 1, wherein the set of user instructions comprises one or more instructions based on a user preference.

5. The method of claim 1, wherein the set of user instructions comprises one or more instructions based on a temporal parameter.

6. The method of claim 1, wherein the set of user instructions comprises one or more instructions based on a location parameter.

7. The method of claim 1, wherein the set of user instructions comprises one or more instructions based on a commercial activity parameter.

8. The method of claim 1, wherein the set of user instructions comprises one or more instructions attributed to a given third party application.

9. The method of claim 1, wherein the one or more entities comprise one or more social network providers.

10. The method of claim 1, wherein the one or more entities comprise one or more telecommunications providers.

11. The method of claim 1, wherein said granting comprises providing to the one or more application programming interface providers (i) information identifying the user and (ii) information specifying the one or more items of the user resources to be exposed.

12. The method of claim 1, comprising:
    managing renewal of one or more authorizations to access the user resources at the one or more application programming interface providers.

13. A computer program product, the computer program product comprising a non-transitory computer readable storage medium having program instructions embodied therewith, the program instructions executable by a computing device to cause the computing device to:
    compile, via a single brokerage component, a set of user instructions for providing access of user resources stored across multiple separate domains to one or more third party applications across one or more distinct domains, wherein the set of user instructions specifies a context which permits or denies each of multiple items of the user resources at one or more application programming interface providers to be accessed by the one or more third party applications, and wherein at least a portion of the context is determined by an action performed by a user at one or more of the distinct domains;
    map a request from one of the third party applications for access to one or more items of the user resources to the one or more application programming interface providers, which correspond to one or more entities maintaining the user resources; and
    grant access to the one or more items of the user resources to said one third party application through the one or more application programming interface providers based on the set of user instructions, from a common user interface exposed by the brokerage component without obtaining additional input from the user in connection with the request.

14. The computer program product of claim 13, wherein the set of user instructions comprises one or more instructions based on a user preference, one or more instructions based on a temporal parameter, and/or one or more instructions based on a location parameter.

15. The computer program product of claim 13, wherein the set of user instructions comprises one or more instructions based on a commercial activity parameter.

16. The computer program product of claim 13, wherein the set of user instructions comprises one or more instructions attributed to a given third party application.

17. A system comprising:
a memory; and
at least one processor coupled to the memory and configured for:
- compiling, via a single brokerage component, a set of user instructions for providing access of user resources stored across multiple separate domains to one or more third party applications across one or more distinct domains, wherein the set of user instructions specifies a context which permits or denies each of multiple items of the user resources at one or more application programming interface providers to be accessed by the one or more third party applications, and wherein at least a portion of the context is determined by an action performed by a user at one or more of the distinct domains;
- mapping a request from one of the third party applications for access to one or more items of the user resources to the one or more application programming interface providers, which correspond to one or more entities maintaining the user resources; and
- granting access to the one or more items of the user resources to said one third party application through the one or more application programming interface providers based on the set of user instructions, from a common user interface exposed by the brokerage component without obtaining additional input from the user in connection with the request.

18. A method comprising:
- linking, via an access broker, multiple user resources accounts hosted in multiple separate domains with one or more application programming interface providers corresponding to one or more entities maintaining the user resources, wherein the access broker comprises a party that mediates access to the user resources hosted in the multiple separate domains;
- providing, to the access broker, a set of user instructions for permitting access of the user resources hosted in the multiple separate domains to one or more third party applications across one or more distinct domains, wherein the set of user instructions specifies a context which permits or denies each of multiple items of the user resources to be accessed by the one or more third party applications, wherein at least a portion of the context is determined by an action performed by a user at one or more of the distinct domains; and
- delegating, to the access broker, granting of access to the user resources to one of the third party applications through the one or more application programming interface providers, from a common user interface exposed by the access broker without obtaining additional input from the user in connection with the request, wherein said granting of access is based on the set of user instructions;
- wherein said providing, said linking, and said delegating are carried out by at least one computing device.

* * * * *